(12) United States Patent
Reese et al.

(10) Patent No.: US 6,170,324 B1
(45) Date of Patent: Jan. 9, 2001

(54) TIRE AND RIM ASSEMBLY CENTERING METHOD

(75) Inventors: David Thomas Reese, Copley, OH (US); Ronald Simon Roethlisberger, Freeport, IL (US)

(73) Assignee: The Goodyear Tire & Rubber Company, Akron, OH (US)

( * ) Notice: Under 35 U.S.C. 154(b), the term of this patent shall be extended for 0 days.

(21) Appl. No.: 09/155,914

(22) PCT Filed: Feb. 28, 1997

(86) PCT No.: PCT/US97/03220

§ 371 Date: Oct. 5, 1998

§ 102(e) Date: Oct. 5, 1998

(87) PCT Pub. No.: WO97/39321

PCT Pub. Date: Feb. 28, 1997

(30) Foreign Application Priority Data

Apr. 15, 1996 (WO) ................................. PCT/US96/05503

(51) Int. Cl.[7] ............................ E01C 23/00; G01N 19/02
(52) U.S. Cl. ................................. 73/146; 73/8; 33/203.15; 33/203.18
(58) Field of Search .................................. 73/146, 66, 7, 73/8, 9; 29/401.1, 407.05, 407.1, 894.31; 33/203, 203.15, 203.16, 203.17, 203.18, 203.19, 203.2, 203.21; 152/375

(56) References Cited

U.S. PATENT DOCUMENTS

| | | | |
|---|---|---|---|
| 3,808,660 | 5/1974 | Wik | 29/159 R |
| 4,011,659 | 3/1977 | Horvallius | 33/203 |
| 4,279,287 | 7/1981 | Daudi et al. | 152/375 |
| 4,354,407 | 10/1982 | Daudi et al. | 83/55 |
| 4,393,594 * | 7/1983 | Hoffman et al. | 33/203.16 |
| 4,414,843 | 11/1983 | Kounkel et al. | 73/66 |
| 4,475,384 | 10/1984 | Christie | 73/146 |
| 4,479,381 | 10/1984 | Kounkel et al. | 73/66 |
| 4,537,449 | 8/1985 | Hayashi | 301/9 CN |
| 4,815,186 | 3/1989 | Daudi et al. | 29/159 |
| 4,934,184 | 6/1990 | Tsuji | 73/146 |
| 5,033,003 | 7/1991 | Lees, Sr. | 364/463 |
| 5,054,918 | 10/1991 | Downing et al. | 356/152 |
| 5,193,274 | 3/1993 | Ball et al. | 29/894 |
| 5,380,071 | 1/1995 | Kier, Jr. | 301/63.1 |

OTHER PUBLICATIONS

Patent Abstracts of Japan, vol. 4, No. 49 (M–007), Apr. 15, 1990 & JP,A,55019643 (Hino Motors Ltd), Feb. 12, 1980, (copy attached).
Patent Abstracts of Japan, vol. 12, No. 116 (M–684) Apr. 13, 1988 & JP,A,62244704 (Bridgestone Corp.) Oct. 26, 1987, (copy attached).

* cited by examiner

Primary Examiner—Benjamin R. Fuller
Assistant Examiner—Abdullahi Aw-Musse
(74) Attorney, Agent, or Firm—David L King

(57) ABSTRACT

A method for minimizing the radial runout of a tire and rim assembly 10 having the steps of locating the position of maximum radial runout and measuring the amount of maximum radial runout; loosening the threaded fasteners 24 attaching the rim 20 and disk 22; and moving the disk 22 radially toward the location of the maximum radial runout a distance one-half the measured runout amount and then retightening the threaded fasteners is disclosed. The method minimizes first harmonic vibrations caused by the normal assembly of these components.

3 Claims, 14 Drawing Sheets

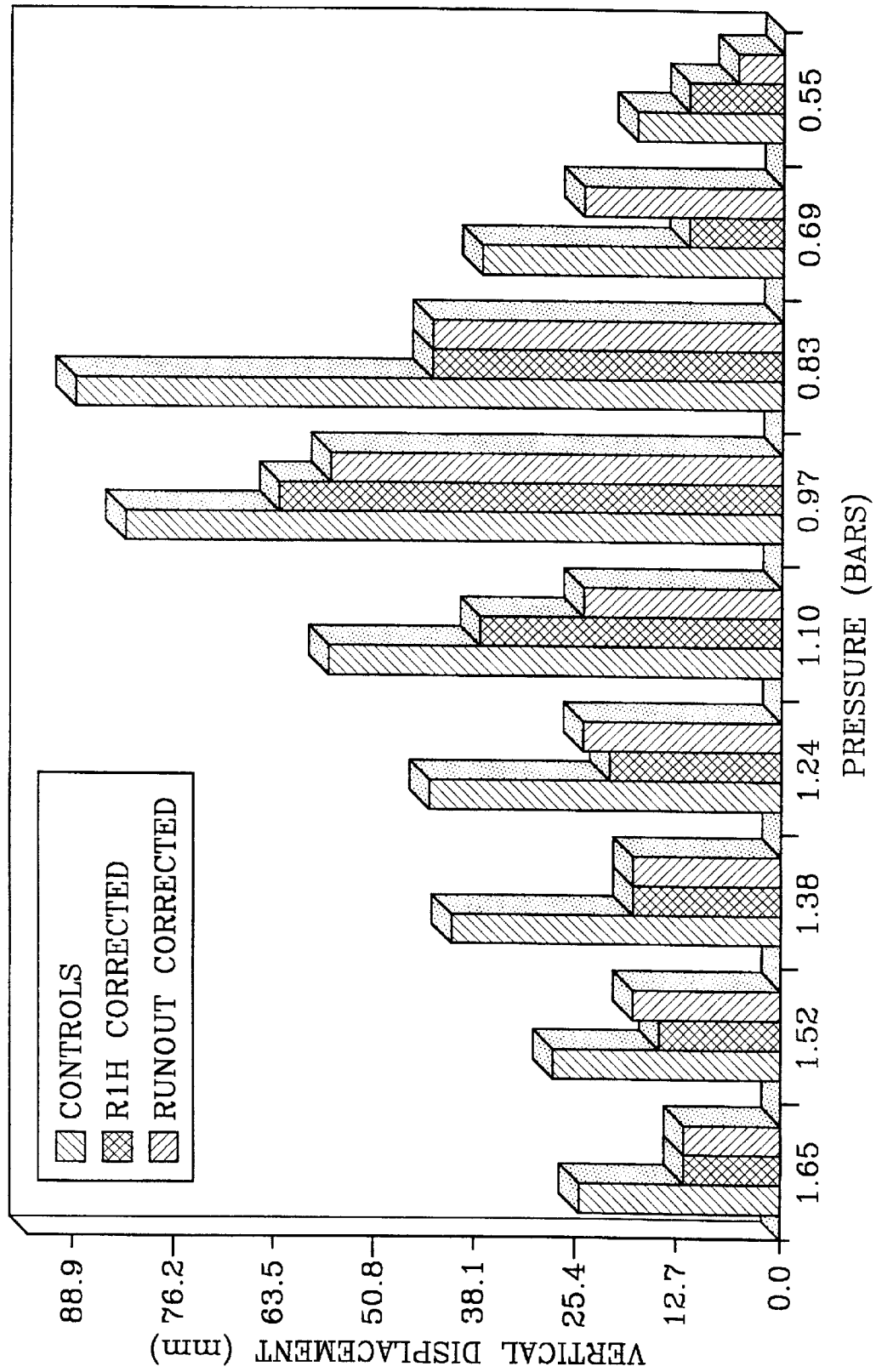

TIRE AND RIM ASSEMBLY CENTERING METHOD

TECHNICAL FIELD

This invention relates to a novel method for correcting the radial runout of a tire and rim wheel assembly. More particularly, the method corrects ride vibration problems associated with large tires and rims specifically designed for off-road or agricultural use. The method corrects or minimizes the radial runout of farm tires and their two piece rim wheel assembly.

1. Background Art

Large tires for tractors and the like vehicles are conventionally mounted on large two piece rims. The radially outer portion is an annular ring commonly referred to as the rim. The rim is adapted to hold the tire. The rim has a 5° bead seat, a pair of axially out flanges, and a drop center portion to facilitate mounting the fire over the flange portions. This annular ring further has a radially inner flange with a plurality of clearance holes to which the second portion of the rim is attached.

The second portion of the rim is a disk which has a central opening which preferably is tapered, this central opening engages the drive axle of the vehicle to which it is attached. The drive axle preferably is a tapered male end and when attached to the disk portion of the rim both parts have their respective axis of rotations substantially coincident.

Radially outward of the central opening is a plurality of holes which can be aligned with the openings of the rim and bolted to the rim by means of threaded fasteners.

These attachment holes in both the rim and the disk portion each have a clearance or relatively larger opening to accept the threaded fasteners. These dimensional tolerances permit the mounted tire and rim assembly to have their respective axis of rotation to be shifted relative to the common axis of the vehicle axle and wheel disk assembly. This ability to shift the relative position of the mounted tire and rim assembly relative to the disk portion can be positively beneficial in reducing tire and rim assembly vibration on tractors and the like vehicles. These vibration amplitudes are most disturbing on hard paved surfaces when the tractors are driven at relatively high speeds in excess of 30 km/h.

The prior art methods to correct this tire wheel assembly vibration characteristic involves numerous required steps of locating a maximum radial runout location, deflating the tire, breaking down the beads and rotating the tire to a distinct, precise location on the rim, reinflating the tire and remounting the tire rim assembly. This method of vibration reduction is commonly referred to as match mounting. When precisely accomplished the desired resultant vibration reduction can be achieved. The match mounting method is inherently time consuming, requires the tire beads to be detached from the rim, often times the fluid medium is a liquid which must be captured and reinjected into the tire, and after completing this procedure if not properly conducted the desired reduction in vibration will not result.

2. Disclosure of the Invention

This invention relates to a method for minimizing the radial runout of a tire and rim assembly 10, the rim 12 having an outer annular rim 20 and a disk 22 attached to the outer rim 20 by threaded fasteners 24. The inventive method can be summarized by the following steps:

locating the position of maximum radial runout and measuring the amount of maximum radial runout;
loosening the threaded fasteners 24;
moving the disk 22 radially toward the location of the maximum radial runout a distance one-half the measured maximum runout amount, and then tightening the thread fasteners 24 thereby securely attaching the disk 22 to the tire 14 and outer rim 20 of the assembly.

The step of locating and measuring the maximum runout preferably can be accomplished by rotating the tire and rim assembly 10 about an axis of rotation. For example, the tractor like vehicle can be jacked up or placed on a lift whereby the normally inflated and unloaded tire 14 can be freely rotated. A runout measuring device 30 is used to locate the maximum runout location 2 preferably the runout device can be zeroed at that location 2 and rotated to read the runout at a location 4 approximately 180° from the maximum runout location 2. This measured runout is considered for the purposes of this invention to be the amount of radial runout. The preferred device 30 preferably automatically indicates one-half the total amount of runout. This "one-half amount" is useful because it is the exact amount of adjustment that is required to zero the runout of the tire rim assembly 10. These two locations 2,4 are marked and in the most preferred method the operator then rotates the tire rim assembly 10 such that the location where rim disk 22 central opening 26 is contacting the axle 11 is oriented at the vertical or on top of the axle 11, in other words at a 12:00 o'clock orientation. The axle 11 and the disk 22 are both marked at that location 6, prior to removing the tire and rim assembly. After removing the tire and rim assembly 10 the assembly 10 is positioned in a horizontal position, preferably over a support device 40. Then, an apparatus 50 for precisely moving the disk 22 is inserted into the support device 40 and a pusher bar 52 on the apparatus 50 is placed in proximity to the opening 26 of the central disk 22 at a location aligned with the maximum radial runout mark 2 and the 180° location 4. Each of the threaded fasteners 24 are loosened such that the disk 22 and the rim 20 are free to accept relative movement. Prior to moving the disk 22, a device 60 for measuring the relative movement of the disk in relation to the tire 14 and rim 12 is placed in position aligned between the radial runout mark 2 and the 180° mark 4. The displacement of the dial indicator arm is parallel to a line extending from 2,4. The dial indicator can be placed anywhere so long as the arm is parallel to the line 2,4. Preferably, measuring the device 60 includes a dial indicator 62 that can be set to the amount of displacement required which is precisely one-half the amount of the measured runout. The operator can then actuate the apparatus 50 which advances the pusher bar 52 which moves the disk 22 toward the location 2 of the maximum runout. At the point where the dial indicator 62 reads zero the disk 22 movement is stopped and the threaded fasteners 24 are retightened. The assembly 10 is then reattached to the axle 11 making sure that the axle 11 and disk 22 marks 6 are in the top vertical or 12:00 o'clock position. At this point the tire rim assembly 10 will have been assembled minimizing the first harmonic radial runout.

Most preferably the centering of the tire and rim assembly 10 should be accomplished without physically removing the tire and rim assembly 10 from the vehicle to which it is attached. This can be accomplished very simply by employing tapered bolts 24A. After the tire is marked at the highest runout location, this marked location is moved to the 6 o'clock location, the location closest to the ground, then the standard fasteners 24 in locations approximately 3 and 9 o'clock respectively are removed and replaced with the tapered bolts 24A. These bolts 24A are tightened until they contact the clearance holes 28 of the rim 20. The procedure then requires the remaining standard bolts 24 to be loosened until the center disk 22 and the rim 20 are free to move relative to the other. Then, by slowly tightening the taperbolts 24A the rim 20 will ride up the taper of the bolts 24A. The desired vertical displacement of the rim 20 is achieved in this way. Unwanted lateral or horizontal movement is "zeroed out" by simply tightening one of the tapered bolts 24A to force a left or right shift. Once the rim 20 is moved vertically by one-half the measured runout distance then the tire wheel assembly 10 can be retightened using the standard bolts 24. The runout can then be rechecked and verified. Assuming the assembly 10 is within acceptable runout limits the reduction in radial first harmonic forces will be achieved.

If the runout is still too high a repeat of the procedure is done which should achieve the desired result. The benefits of this procedure is that the corrections can easily be accomplished in the field without requiring removal of the tire and rim assembly 10 from the vehicle. These assemblies 10 weigh several hundreds of pounds and by not requiring it to be removed means that one technician can more safely accomplish the task in less time than previously thought possible.

Definitions

For ease of understanding this disclosure the following terms are disclosed:

"Aspect Ratio" means the ratio of the tire's section height to its section width.

"Axial" and "axially" means the lines or directions that are parallel to the axis of rotation of the tire.

"Bounce" or "Hop" means the vertical acceleration related to first Harmonic Radial Runout or Force Variation of each tire and rim assembly interacting with the other tire and rim assemblies of the vehicle.

"Circumferential" means lines or directions extending along the perimeter of the surface of the annular tire parallel to the equatorial plane EP and perpendicular to the axial direction.

"Design Rim" means a rim having a specified configuration and width. For the purposes of this specification, the design rim and design rim width are as specified by the industry standards in effect in the location in which the tire is made. For example, in the United States, the design rims are as specified by the Tire and Rim Association. In Europe, the rims are as specified in the European Tyre and Rim Technical Organization—Standards Manual and the term design rim means the same as the standard measurement rims. In Japan, the standard organization is The Japan Automobile Tire Manufacturer's Association.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Inner" means toward the inside of the tire and "outer" means toward its exterior.

"Lateral Edge" means the axially outermost edge of the tread as defined by a plane parallel to the equatorial plane and intersecting the outer ends of the axially outermost traction lugs at the radial height of the inner tread surface.

"Leading" refers to a portion or part of the tread that contacts the ground first, with respect to a series of such parts or portions, during rotation of the tire in the direction of travel.

"Lope" means once per revolution fore & aft acceleration/deceleration related to first harmonic radial runout or force variation of tire and rim assembly.

"Net-to-gross Ratio" means the ratio of the surface area of the normally loaded and normally inflated tire tread rubber that makes contact with a hard flat surface, divided by the area of the tread, including noncontacting portions such as grooves as measured around the entire circumference of the tire.

"Normal Inflation Pressure" means the specific design inflation pressure assigned by the appropriate standards organization for the service condition for the tire.

"Normal Load" means the load assigned by the appropriate standards organization for the service condition for the tire when inflated to the normal inflation pressure.

"Radial" and "radially" mean directions radially toward or away from the axis of rotation of the tire.

"Shake" means higher frequency lug induced vibration felt in cab or steering wheel or seen in movement of the exhaust stack (no particular acceleration).

"Shudder" means a lug induced vibration at low frequency, resulting in a vertical acceleration felt through the floor of the cab.

"Trailing" refers to a portion or part of the tread that contacts the ground last, with respect to a series of such parts or portions during rotation of the tire in the preferred direction of travel.

"Tramp" means side-to-side motion, or lateral acceleration, induced by first harmonic radial runout or force variation of each tire and rim assembly interacting with each other.

"Tread Arc Width" (TAW) means the width of an arc having its center located on the equatorial plane (EP) and which substantially coincides with the radially outermost surfaces of the various traction elements (lugs, blocks, buttons, ribs, etc.) across the lateral or axial width of the tread portions of a tire when the tire is mounted upon its designated rim and inflated to its specified inflation pressure but not subject to any load.

"Unit Tread Pressure" means the radial load borne per unit area (square centimeter or square inch) of the tread surface when that area is in the footprint of the normally inflated and normally loaded tire.

"Vibration Ratings" means the subjective ride terminology wherein "slight" means barely noticeable; "moderate" means noticeable but not objectionable; "severe" means objectionable.

BRIEF DESCRIPTION OF DRAWINGS

FIGS. 9A, 9B and 9C depict three charts which show the approximate vertical displacement of the axle 10 at various tire inflation pressures for speeds of 32 km/m, 35 km/h and 42 km/h reading left to right the first bar being the tire wheel assembly prior to connecting the radial runout, the second bar representing a first harmonic corrective procedure, the third bar representing the simplified inventive method to correct the runout.

DETAILED DESCRIPTION OF THE INVENTION

Figure 1:
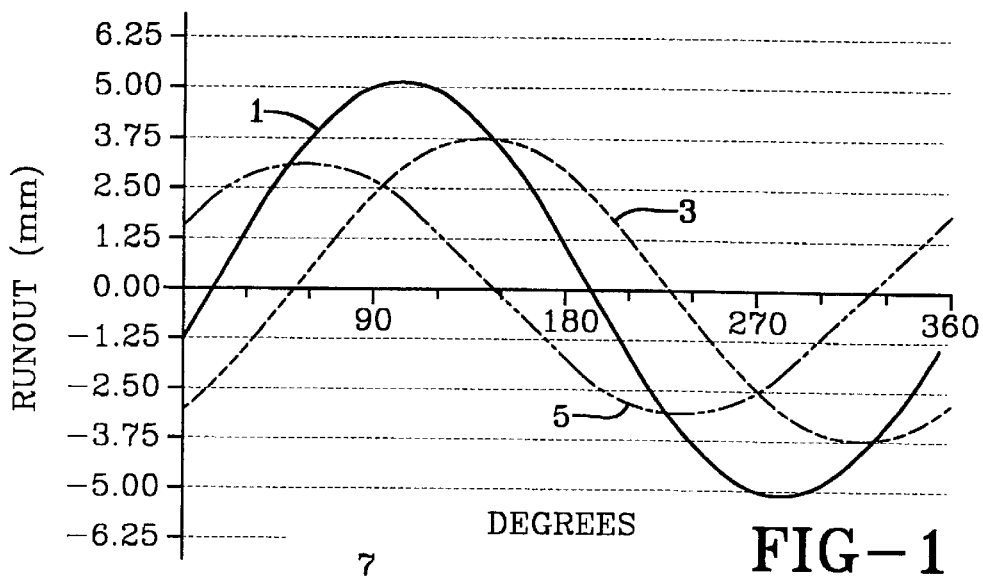
FIG. 1 shows a chart of the typical radial runout first harmonic with the tire and rim in their initial positions at 0°.

FIG. 1 shows the radial runout first harmonic measured in mm of a agricultural tire 14 and rim 12 assembly 10. The bold line 1 showing the assembly's radial runout, the dashed line 3 showing the rim 12 radial runout and the dotted line 5 showing the tire radial runout. The initial position is at 0° and traverses the entire 360° around the assembly. For the purposes of this invention, the first harmonic represents the runout condition that is characterized by one high point and one low point. In other words, an out-of-round situation with one high point and one low point in each revolution.

Figure 2:
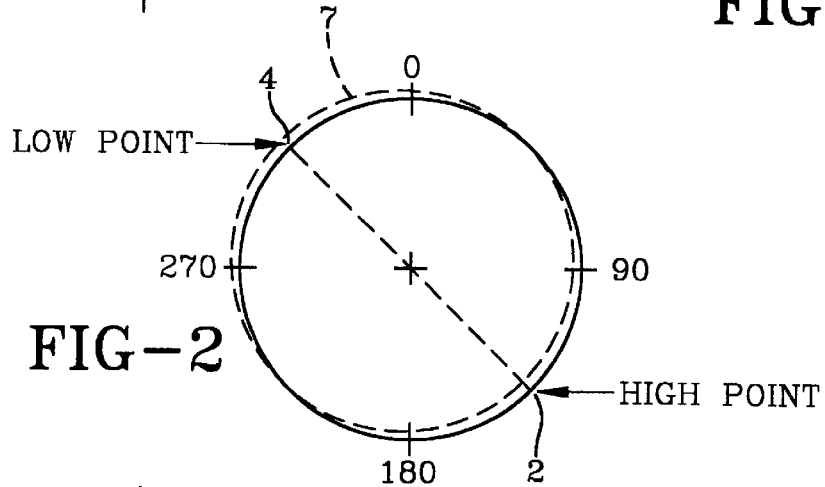
FIG. 2 shows the radial runout first harmonic for a perfect out-of-round condition where the tire rotates about an axis that is slightly off center.

Shown in FIG. 2, is the radial runout first harmonic for a perfect out-of-round condition where the tire rotates about an axis that is slightly off center. As shown in FIG. 2, the high point 2 being shifted off of the true oval center or circular center line 7 and the low point 4 being shifted radially inward of the true circular center line.

This first harmonic high point, low point condition of the tire and rim assembly 10 results in the tire 14 transmitting a harsh vibration to the driver of the vehicle. From past experience, the inventor has determined that the most important harmonic (for speeds up to 42 km/h) is the first harmonic. This first harmonic is felt as a once-per-revolution bounce or lope. If the bounce or lope is bad enough, serious driver jostling in the cab can occur. A vast majority of the ride and handling problems associated in agricultural tires results from this first harmonic radial runout condition.

Figure 3:
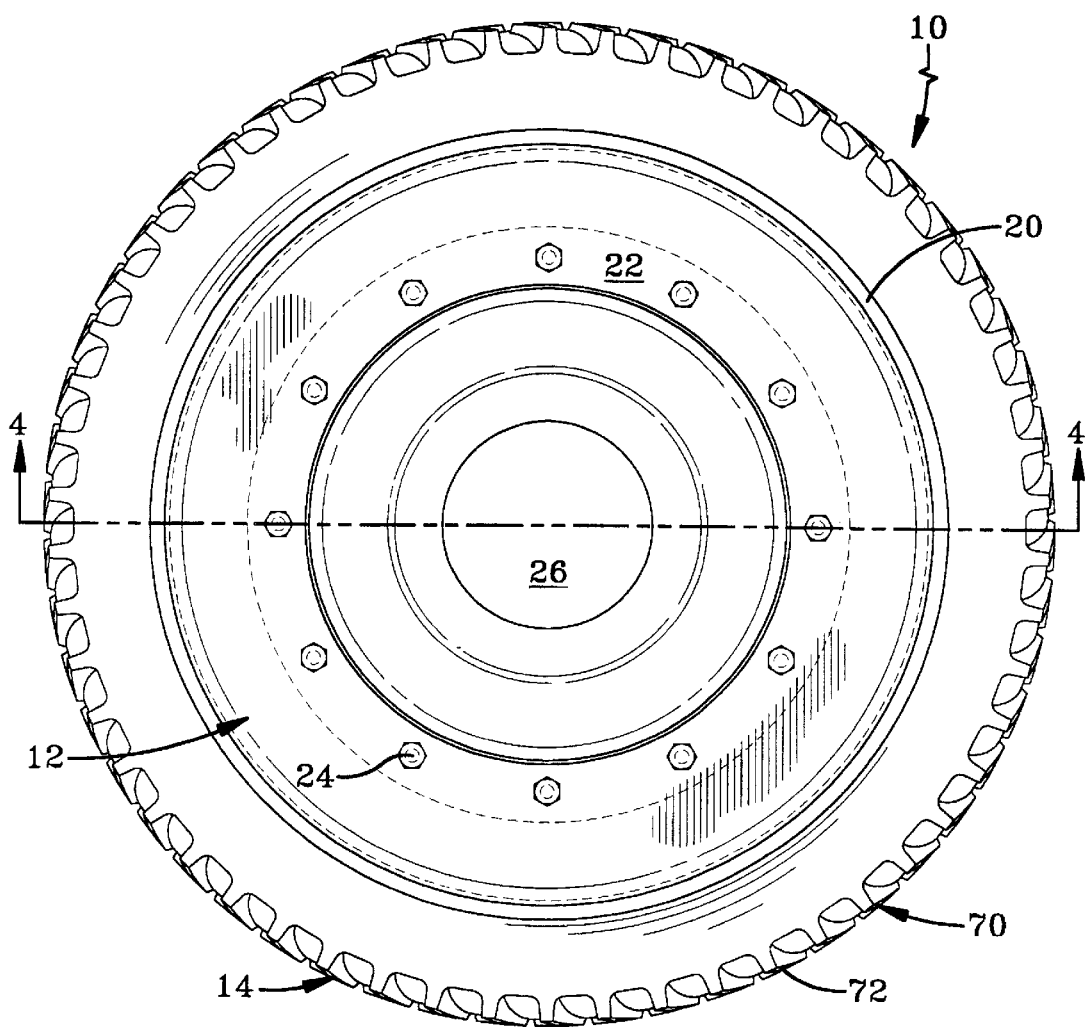
FIG. 3 is a plan view of an exemplary tire and rim assembly 10.
Figure 4:
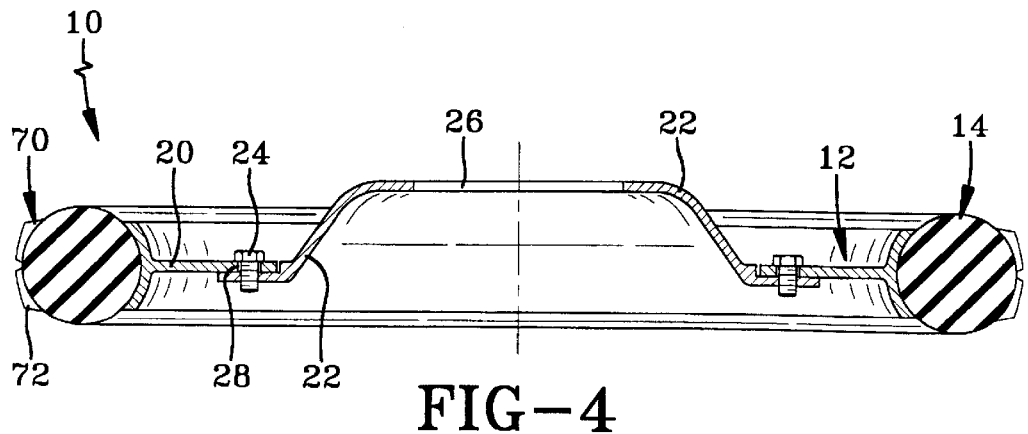
FIG. 4 is a cross-sectional view of the exemplary tire and rim assembly 10 of FIG. 3 taken along lines 4—4.

As shown in FIGS. 3 and 4, an agricultural tire 14 is mounted to a rim 12. The rim 12 has two primary components: a radially outer annular ring or rim 20 to which the tire 14 is mounted and a radially inner central disk 22. The central disk 22 mounts over the axle 11 of the vehicle and is bolted by means of threaded fasteners 24 to the annular outer ring or rim 20 thereby making a completed assembly 10. With further reference to the cross-sectional view of FIG. 4, it can be seen that the threaded fasteners 24 securely fasten the disk 22 to the rim 20. This plural of threaded fasteners 24 pass through clearance holes 28 in the rim 20. The clearance holes 28 must be of sufficient size to permit the rim 20 and disk 22 to be attached easily. These clearance holes 28 can provide a displacement of the disk 22 relative to the rim 20 by as much as 5 mm in any one direction.

Historically, this displacement could cause a misalignment of the axis of rotation of the rim assembly 10 relative to the drive axle 11 of the vehicle. As will be discussed later, this detrimental effect can be used advantageously to compensate for the overall radial runout of the tire and rim assembly 10.

For example, should the operator of a tractor or like agricultural vehicle find that his tire and rim assembly 10 is creating an objectionable or severe vibration. It may be possible to correct this situation using the following procedure.

Figure 5:
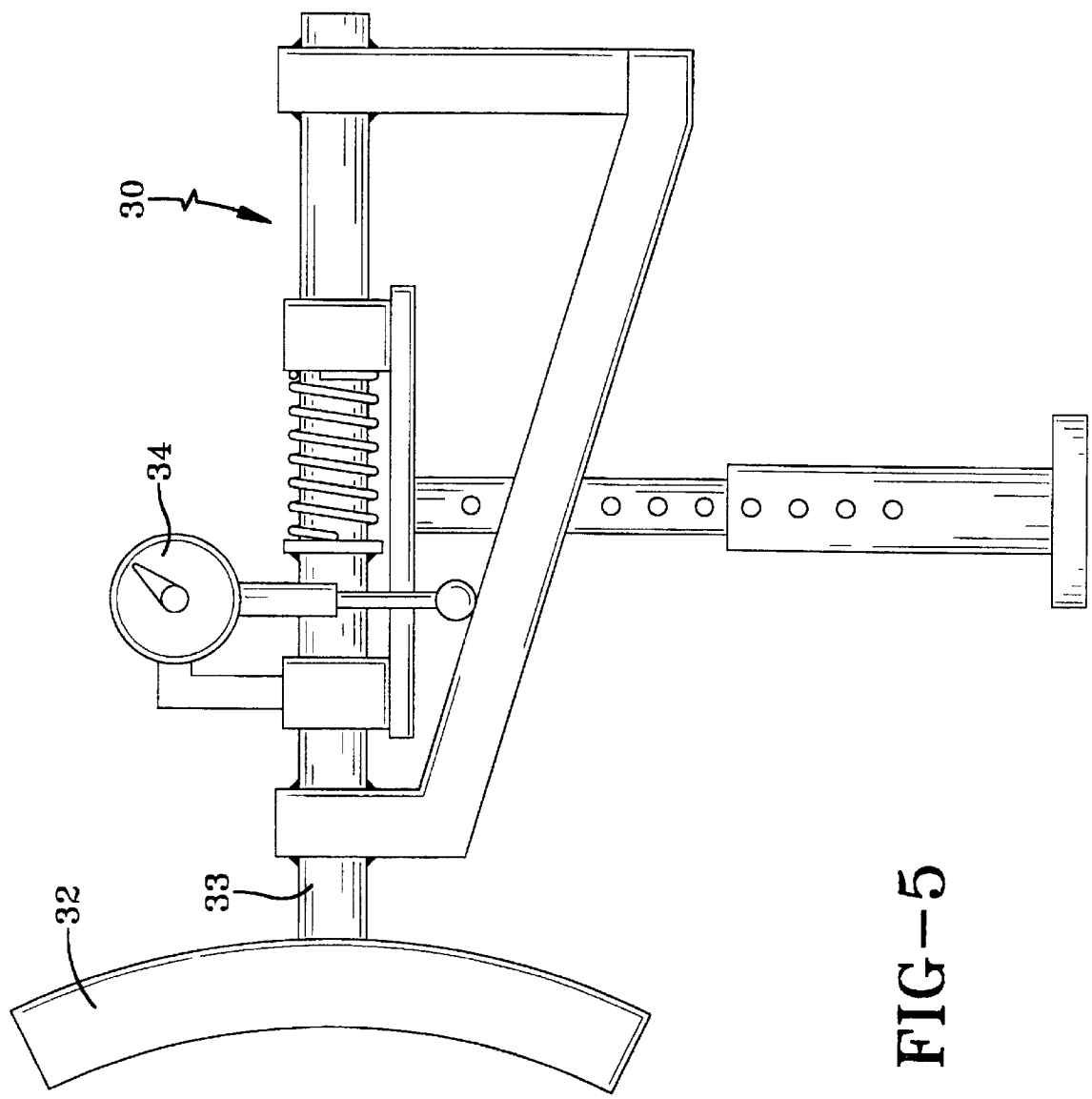
FIG. 5 is a view of a preferred apparatus for locating and measuring the radial runout of the tire and rim assembly.
Figure 6:
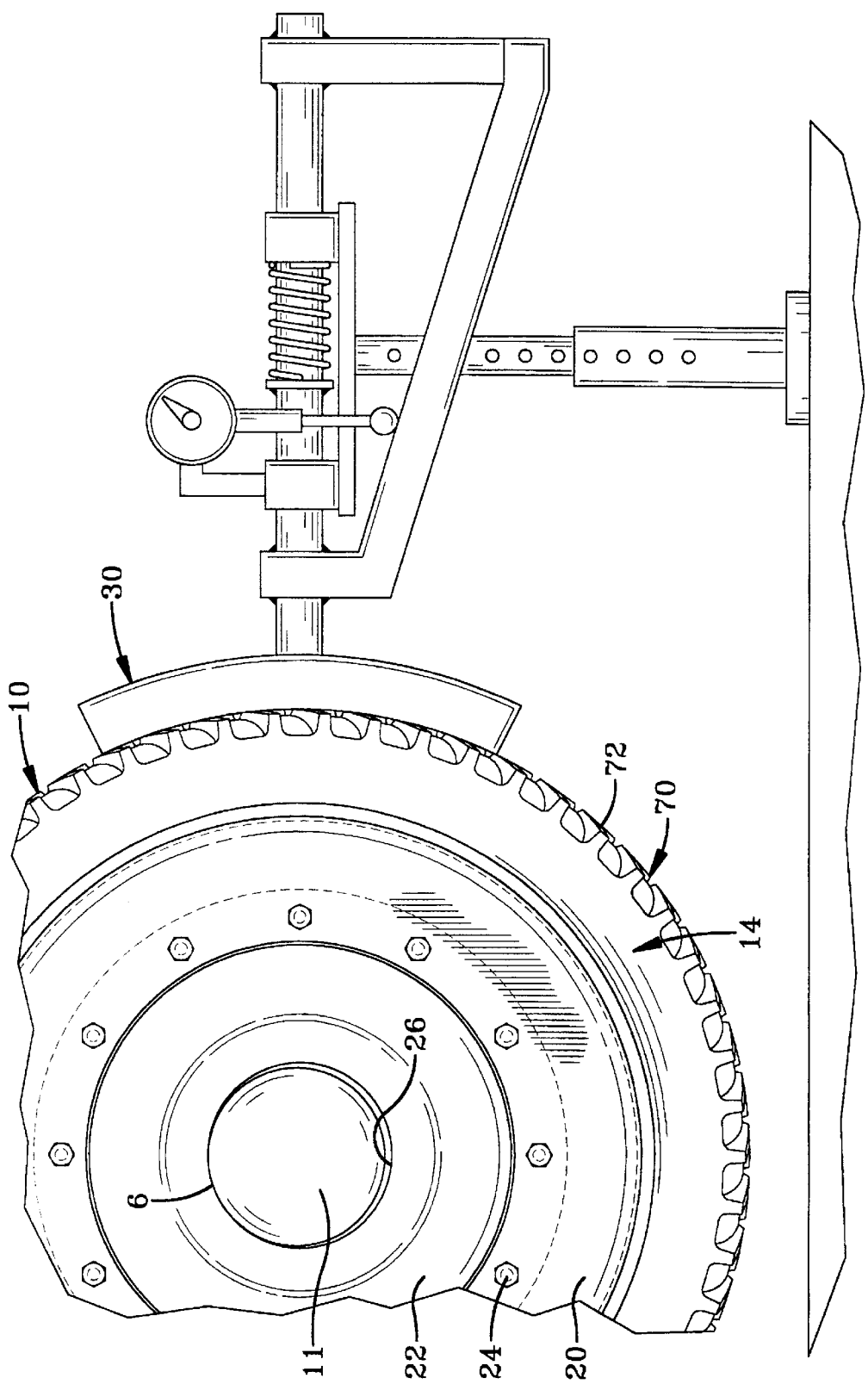
FIG. 6 is a view of the apparatus of FIG. 5 in contact with the outer surface of the tire 14.

The operator could jack the vehicle up so that the tire and rim assembly 10 is able to rotate freely about its axis. Then, by positioning a runout indicator device in proximity to the tire 14, a measurement of the radial runout can be accomplished. This preferred runout indicator device 30 as shown in FIG. 5 has a boot 32 which is attached to an indicator arm 33. This boot 32 is specifically designed to follow the contour of the tread pattern at the equatorial plane of the tire 14 and traverses several of the tractor lugs 72 at one time. The operator simply places the boot gently against the curved contour of the tire tread 70. The boot 32 should span several of the tire's tread lugs 72 at the center line or equatorial plane of the tread 70. The operator adjusts the contour of the boot 32 such that the boot's radius of curvature is slightly larger than the radius of the tire 14. The operator then positions the runout device 30 such as the dial indicator arm 33 is initially displaced approximately half of its total allowable travel. The operator then zeros the dial indicator 34. He then slowly rotates through a complete 360° rotation making note of the location of the tire 14 where the dial indicator 34 registers the lowest value (the greatest negative value). He then rotates the tire and rim assembly 10 back to the location 4 corresponding to the lowest indicator value. He then re-zeros the dial indicator. He slowly rotates the tire 14 through a 360° rotation making note of the location 2 and magnitude of the highest point on the tire 14. He then makes a mark on the tire at this high point. The magnitude displaced is the total radial runout of the tire and rim assembly 10 relative to the hub or axle 11 center. This magnitude follows a one-to-one relationship with the displacement of the indicator.

However, the preferred device shown in FIG. 5 has a sloped indicator readout such that as the boot 32 is displaced the dial indicator 34 only moves one-half of the distance of the boot's displacement. This preferred device 30 will provide a simpler mechanism for the operator to make his measurements. The device magnitude displayed on the indicator using the apparatus shown in FIG. 5 results the magnitude being one-half the total radial runout of the tire and rim assembly 10 relative to the center of the axle 11. This preferred, although not required, measurement reading permits the operator to directly use this measurement when he attempts to center the disk 22 relative to the outer rim 20 as will be discussed later. Alternatively, the operator can establish the runout with a simple dial indicator having a standard full scale read and conventional pointer, without a contoured boot.

The operator should then check the clearance between the axle 11 and the center disk 22 opening 26. Typically, the axle 11 and the center disk 22 will be touching at some location 6. The operator should mark on both the hub and the center disk this point of contact 6. If there is no point 6 in contact, he should make a mark at a point 6 where the clearance is minimum. This will be important when reattaching the tire and rim assembly 10 back to the tractor.

Figure 7:
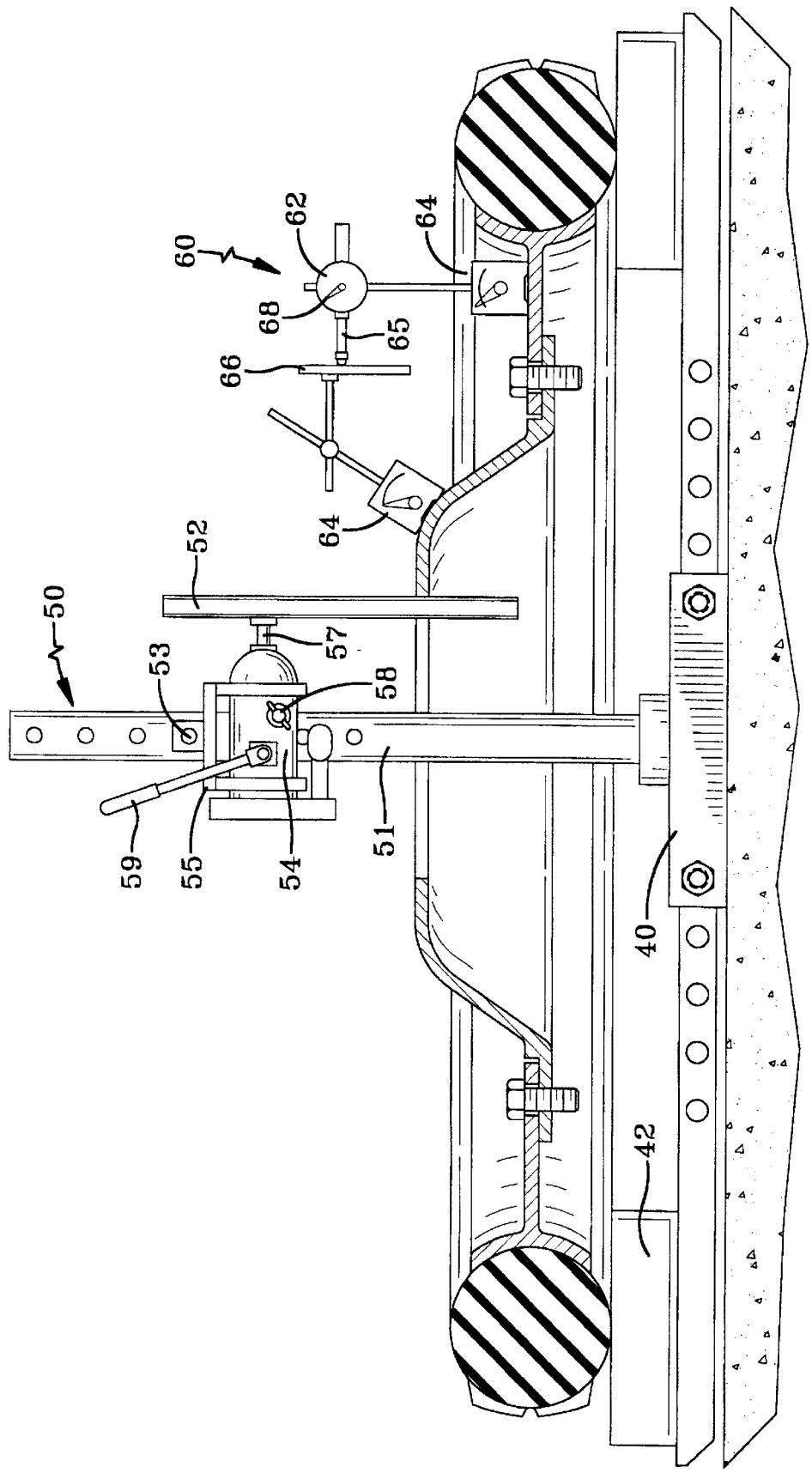
FIG. 7 is a view of a preferred apparatus for precisely moving the center disk relative to the tire and rim and the apparatus for measuring that movement.

The operator should then rotate the wheel so that the mark made on the disk 22 and axle 11 is in the vertical or top position when looking at the tire 14. The operator should then lock the axle 11 in this position. He should then remove the tire and rim assembly 10 from the tractor by unbolting the axle hub 11 from the center disk 22. As shown in FIG. 7, the operator should then place the tire over a portable support device 40 on a flat ground level surface. The tire 14 is rotated horizontally as needed so that the point 2 of largest runout is in line with the location in which a pusher bar 52 will be contacting the rim disk opening 26. This may be achieved by the use of an alignment pin that is removably attached to the center of the portable support device 40. The tire 14 is lowered until its entire weight is supported by the arms 42 of the support device 40. The operator then removes any lifting chain or cable if used from the tire and rim assembly 10. He removes the alignment pin and replaces it with the perforated center post 51 as shown in FIG. 7. He then attaches a bottle jack 54 and its holder 55 to the center post 51 with a bolt 53 such that a pusher bar 52 extends at least 50 mm below the point of contact between the pusher bar 52 and the center disk 22. Having accomplished this, the piston 57 of the bottle jack 54 should be radially aligned in the direction of the maximum runout location 2. The operator then loosens the bolts 24 attaching the center disk 22 to the outer rim 20. Once these bolts 24 have been loosened, it is very important that he does not accidentally disturb the placement of the center disk 22 relative to the outer rim 12 and tire 14. He then attaches the dial indicator device 62 to the outer rim 12 using a magnetic base stand 64 as shown in FIG. 7. The indicator 62 should be positioned horizontally so that its arm 65 is parallel with the piston of the bottle jack. He then attaches the second magnetic base stand 64 to the center disk 22 near to the point of contact between the disk 22 and the pusher bar 52. He then positions the flat plate 66 attached to the magnetic base stand 64 so that it contacts and displaces the arm 65 of the dial indicator 62 by approximately 5 mm. The flat plate 66 should be locked in a vertical position perpendicular to the dial indicator arm 62.

The operator should then move the rotating dial 68 of the indicator 62 until the arrow points to the precise value equal to minus or negative one-half of the total runout amount as previously discussed. The operator then makes sure that the bottle jack valve 58 is in the closed position. He attaches a crank handle 59 to the bottle jack 54 and advances the bottle jack piston 57 by repeatedly cycling the crank handle 59. He continues indexing the piston 57 forward until there is a noticeable displacement registered on the dial indicator 62. He continues to slowly index the piston 57 until the indicator dial reads 0. At this point the runout of the tire and rim assembly 10 has been compensated for. He notes that if at any time the indicator 62 fails to register movement of the disk 22 for more than three consecutive cycles of the crank handle 59 the system has reached its mechanical limit, i.e., the disk 22 and the outer rim 20 are physically touching. It is important that the operator stop indexing the piston 57 at this point for continued indexing could damage the devices 40,50.

The operator, having zeroed the assembly 10, can then retighten the threaded fasteners 24 attaching the center disk 22 to the rim 20 starting with the bolts 180° form the contact point between the pusher bar 52 and the center disk opening 26. The operator should use care that the dial indicator 62 does not register any relative movement during these retightening procedures. He should then remove the two magnetic bases 64 and retighten any bolts 24 that were inaccessible due to the positioning of the stands 64. The operator then opens the valve 58 on the bottle jack 54 and manually pushes the piston 57 back into the bottle 54. He removes the bottle jack 54 and holder 55 and center post 51 from its positioning support base 40 and reattaches the tire and rim assembly 10 to the tractor in the same orientation that it was removed from. To do this the operator simply lines up the marks 6 he made and the center disk 22 and the axle 11. Before tightening the bolts 24, he lets the weight of the assembly 10 rest on the axle hub 11. This will position the disk and hub in the same contacting configuration it had prior to correcting the runout.

As a precautionary measure, the operator may then wish to place the runout measuring device 30 in contact with the tire 14 to reverify the runout condition after this correction. To do this he simply repeats the steps that were discussed in the procedure for measuring the runout.

After the correction, the first harmonic runout should be greatly minimize. It should be noted that not all tires and rim assemblies 10 have perfect first harmonic radial runout conditions and that there may be secondary runout conditions. Nonetheless, the adjustment discussed above will minimize the first harmonic input, thus greatly reducing the amount of vibration that the operator of the vehicle was experiencing.

As was noted in the above description, at no time did the operator have to deflate the tire 14 and unseat the tire beads to move the tire relative to the outer rim assembly. Eliminating this procedure saves a tremendous amount of time in correcting the radial runout condition.

Figure 8:
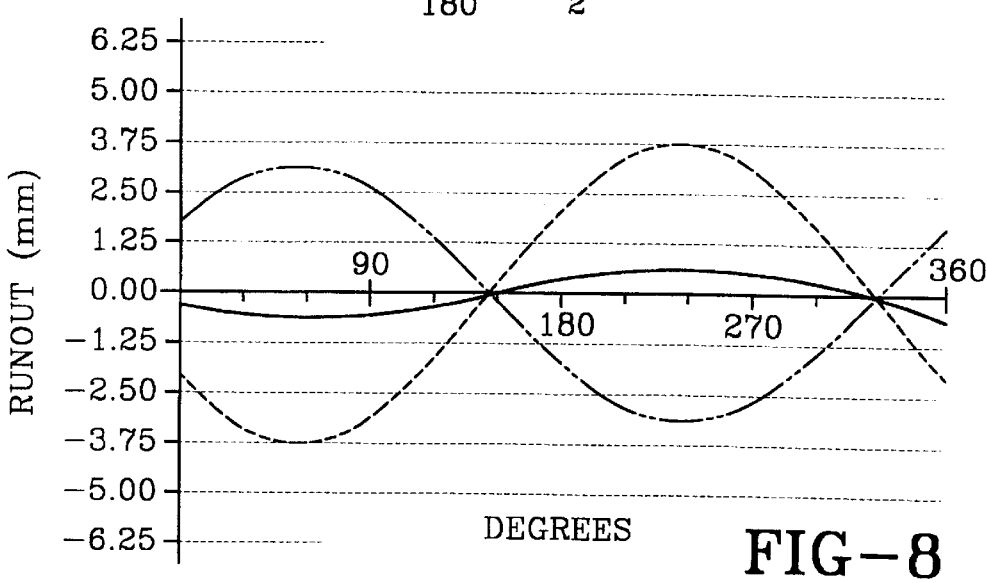
FIG. 8 is a chart showing the resultant runout of the tire and rim assembly after moving the disk relative to the tire and rim. The resultant runout as shown as a solid line, the dashed lines representing the tire and outer rim and the disk runout.

As shown in FIG. 8, the resultant first harmonic runout on reverification should look as shown in the figure. The rim disk displacement has been compensated for the first harmonic of the tire 14 and rim 20 combination resulting in a much lower amount of radial runout. FIG. 8 is representative of an ideal corrective measure.

Figure 9A:
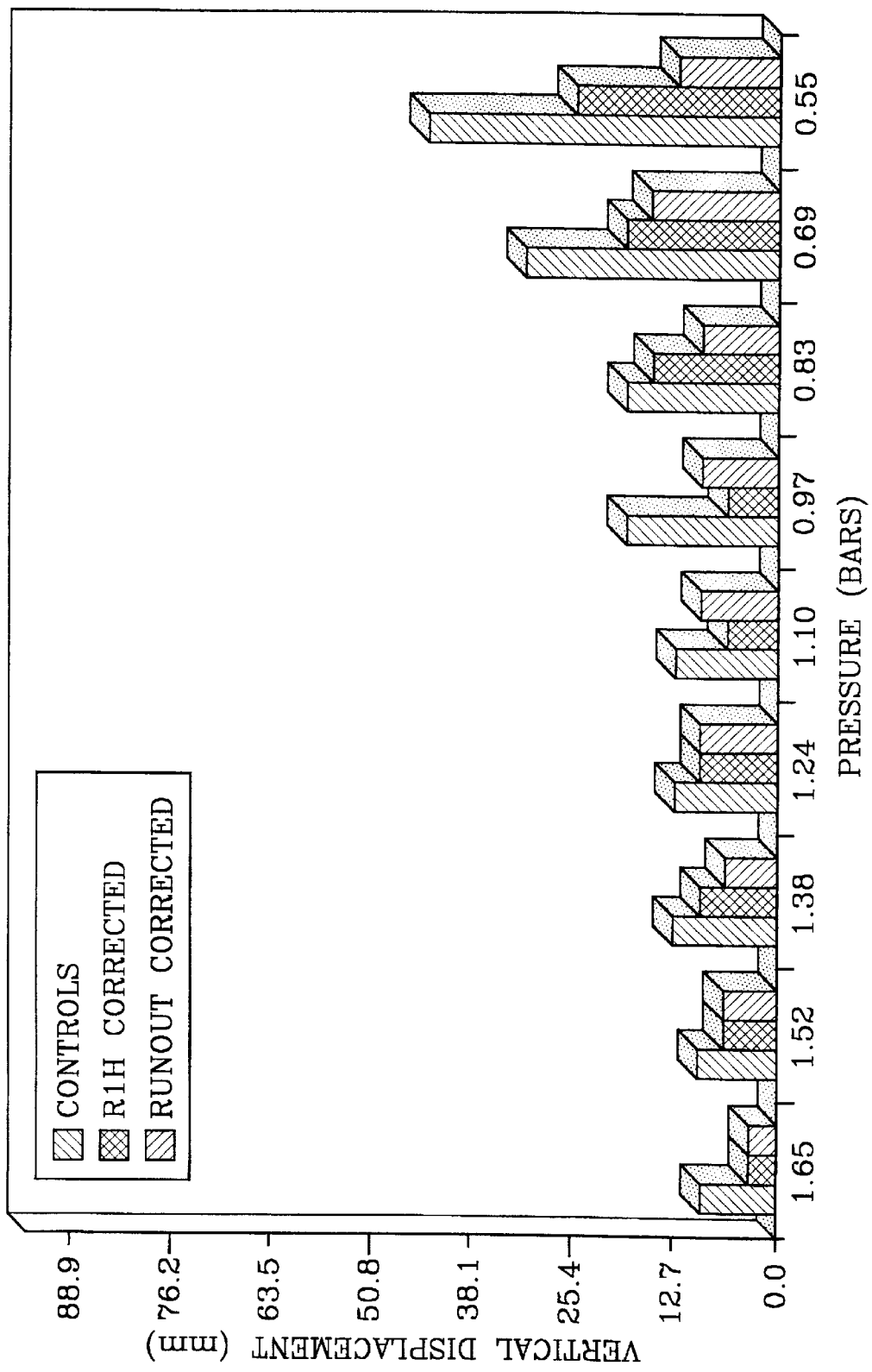
Figure 9B:
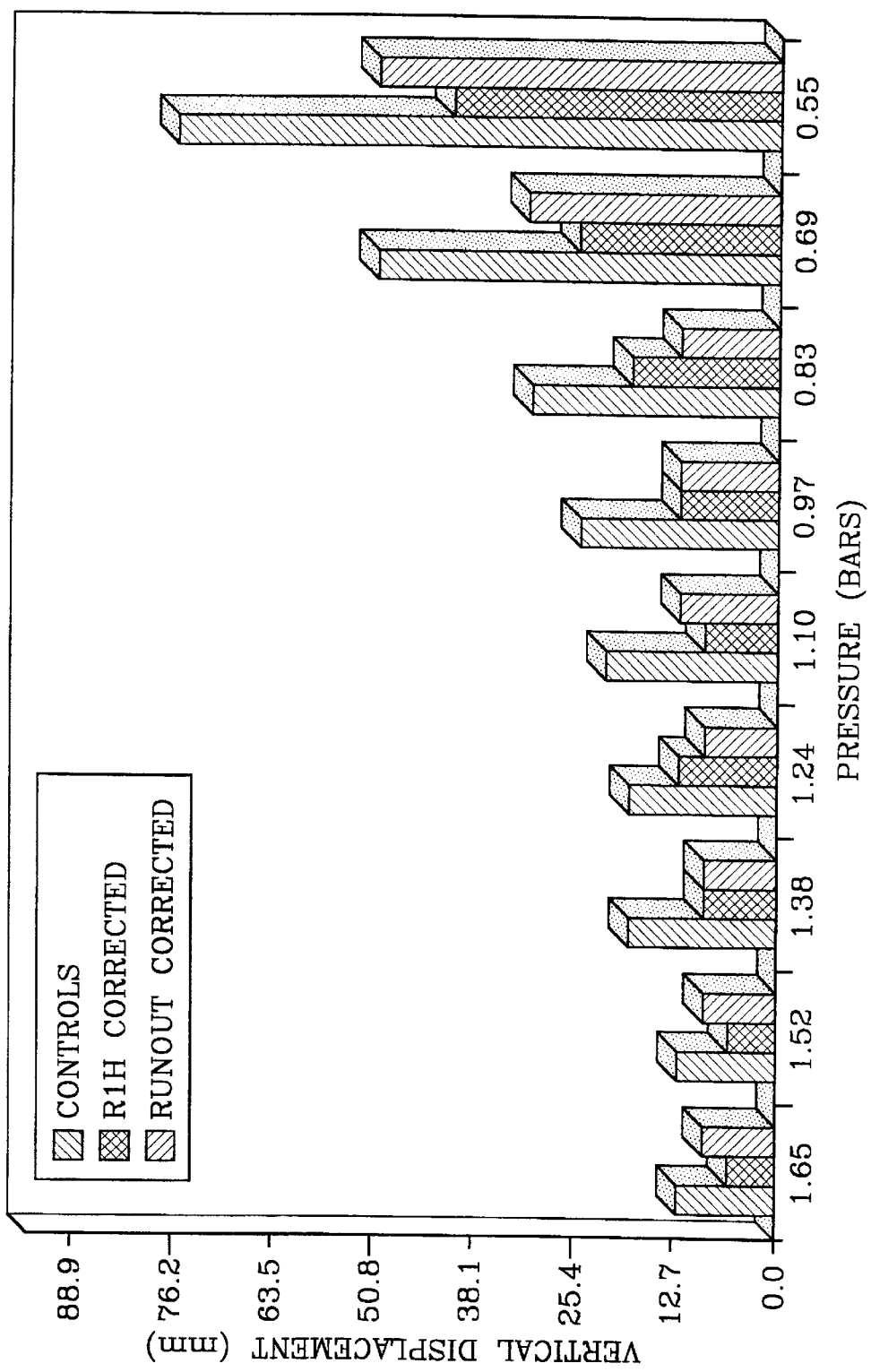

As shown in FIGS. 9A, 9B and 9C, the vertical displacement is illustrated of an exemplary tire and rim assembly. The data for the control tire is shown as the first bar from left to right and its vertical displacement is given at varying pressures ranging from 1.66 bars to 0.55 bars. The second bar (without cross-hatching in the middle) shows the radial first harmonic being calculated in an alternative less preferred method and then being corrected according to the invention. The runout was measured at each lug 72 and then compiled in a computer algorithm to locate and calculate the radial first harmonic displacement. The displacement was corrected using the data and the inventive corrective method of shifting the disk relative to the rim and tire. The third bar farthest right graphically represents a correction whereby the tire and rim assembly was corrected for the measured radial runout using the simplified inventive procedure. As shown in FIGS. 9A, 9B and 9C at all inflation pressures the two corrective procedures are approximately the same. As shown in FIG. 9C, the vertical displacement is very severe at the 42 km/h (26 mph) speed.

From FIGS. 9A, 9B and 9C it can be observed that the vertical displacement generally increases with increases in speed and/or decreases in pressure. The vertical displacement will reach a maximum value, as shown in FIG. 9C (0.83 bars) before it drops off sharply. At this point the tractor system is vibrating near its critical frequency.

It is believed that as vehicle speeds increase on agricultural type vehicles that it will be necessary that the radial runout first harmonic is minimized. The procedure discussed above provides a relatively simple technique in compensating for the radial runout and has demonstrated to be approximately equal to the much more complicated matched mounting procedures known in the prior art.

The most preferred method of centering a tire wheel and rim assembly 10 is to accomplish this task while the assembly is mounted to the vehicle. The following describes a novel procedure which permits this task to be accomplished simply and efficiently by one technician.

Figure 10:
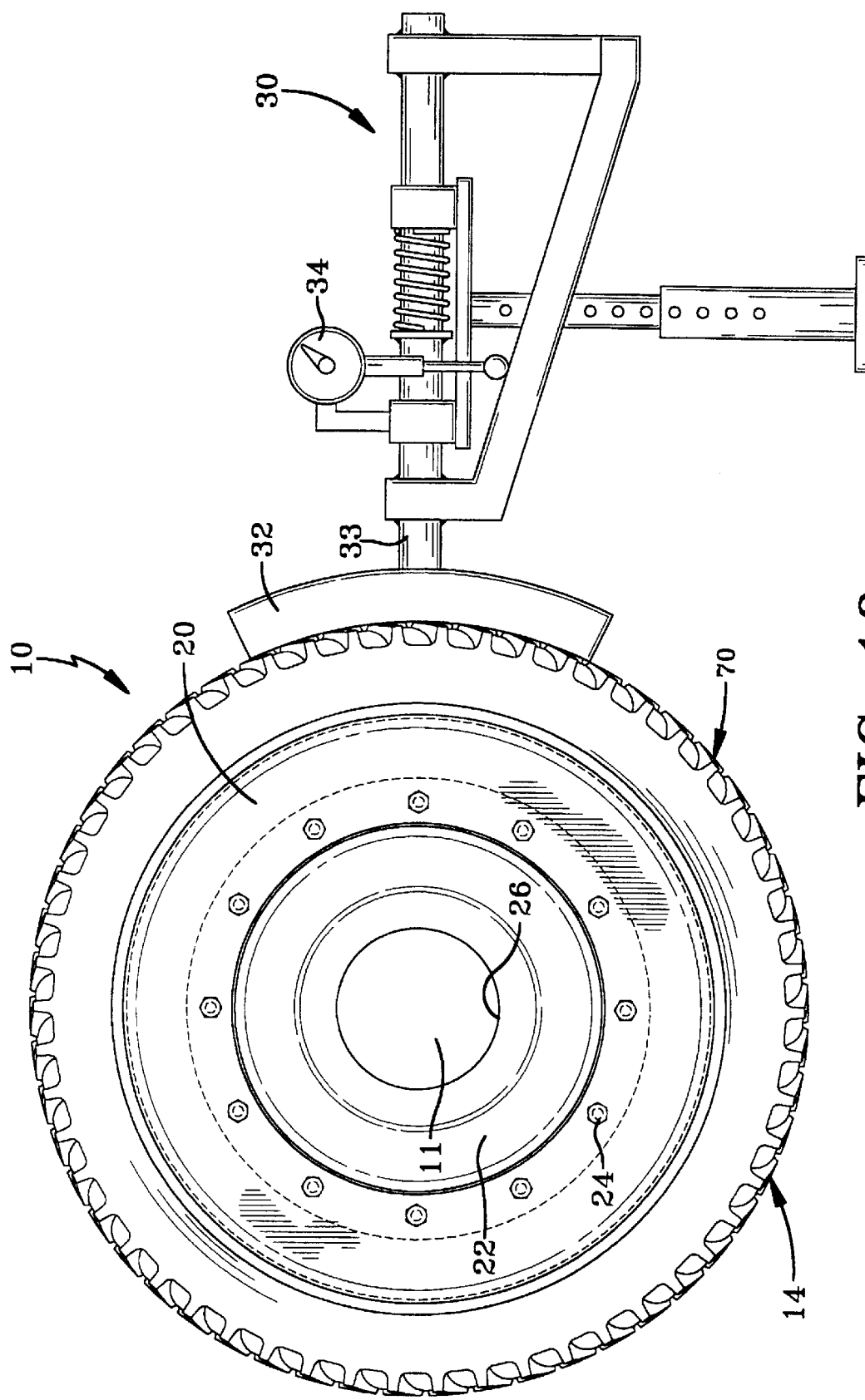
FIG. 10 shows the tire and rim assembly being measured for radial runout using a preferred apparatus FIG. 5.
Figure 11:
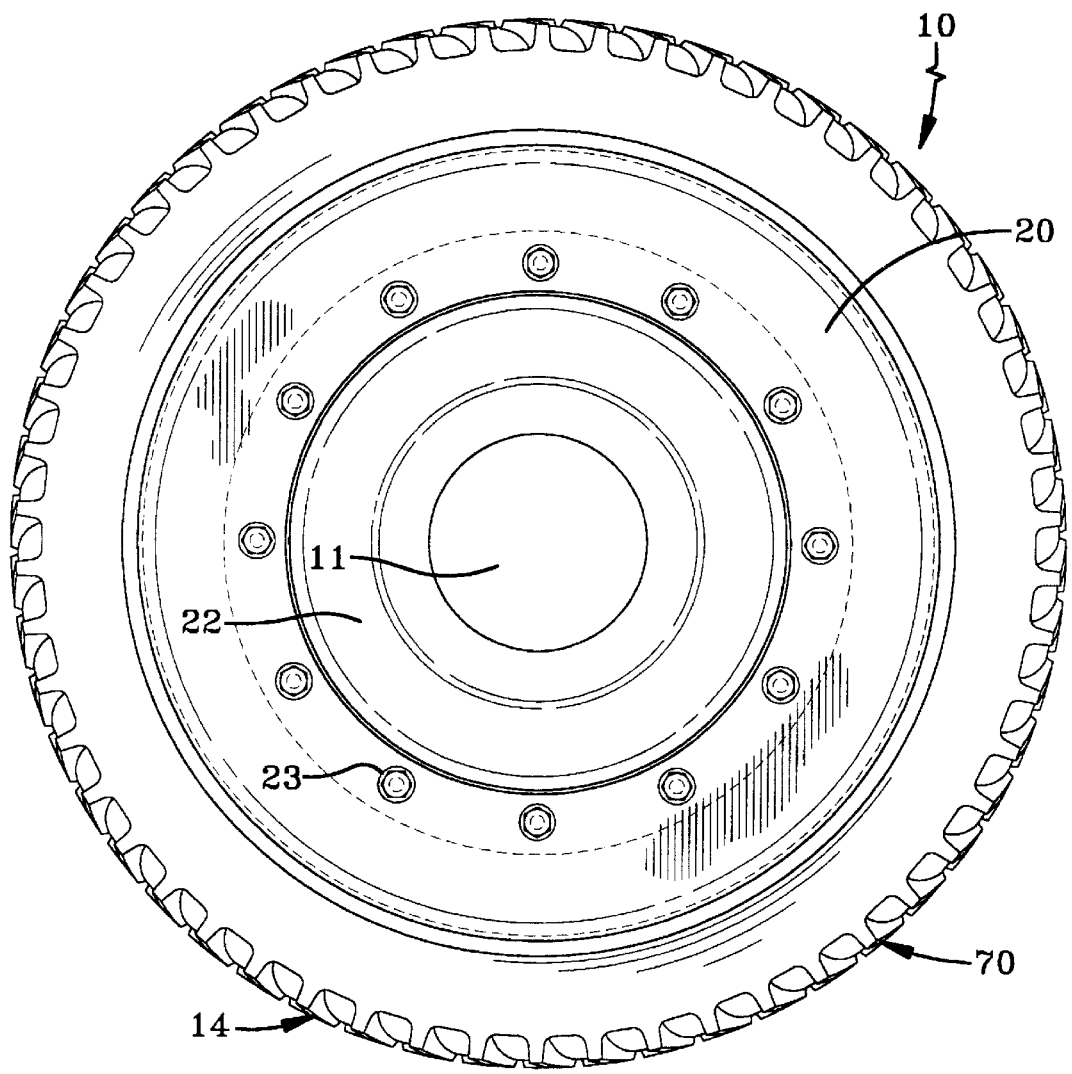
FIG. 11 illustrates the most preferred method of cooing radial runout while the tire and rim assembly 10 is still attached to the vehicle axle 11.

The technician simply jacks the vehicle up so that the tire and rim assembly 10 is able to rotate freely about its axis. The technician cleans the tire lug's dirt and debris along the tire circumferential center line and assembles the runout indicator stand 30 as shown in FIG. 10. The stand 30 is positioned such that the dial indicator arm 32 contacts one of the lugs at the circumferential center line. The arm 32 should be perpendicular to the lug surface as shown in FIG. 10. The technician insures that the point of contact is clear of debris and/or vent holes. He moves the stand 30 relative to the tire 14 so that the indicator arm 32 is initially displaced by approximately one-half of its total allowable travel. The technician then zeros the dial indicator 34. He measures and records the dial indicator readings for each lug 70 by retracting the indicator arm and rotating the tire 14 advances by one lug and then releasing the indicator arm. He continues this process until all the lug measurements in the 360° rotation of the tire 14 have been recorded. The technician then rotates the tire and rim assembly 10 back to the lug location where the indicator 34 registered the lowest value. He then re-zeros the dial indicator and repeats the previous steps of measuring and recording the dial indicator readings for each lug 70 as noted above.

Figure 12:
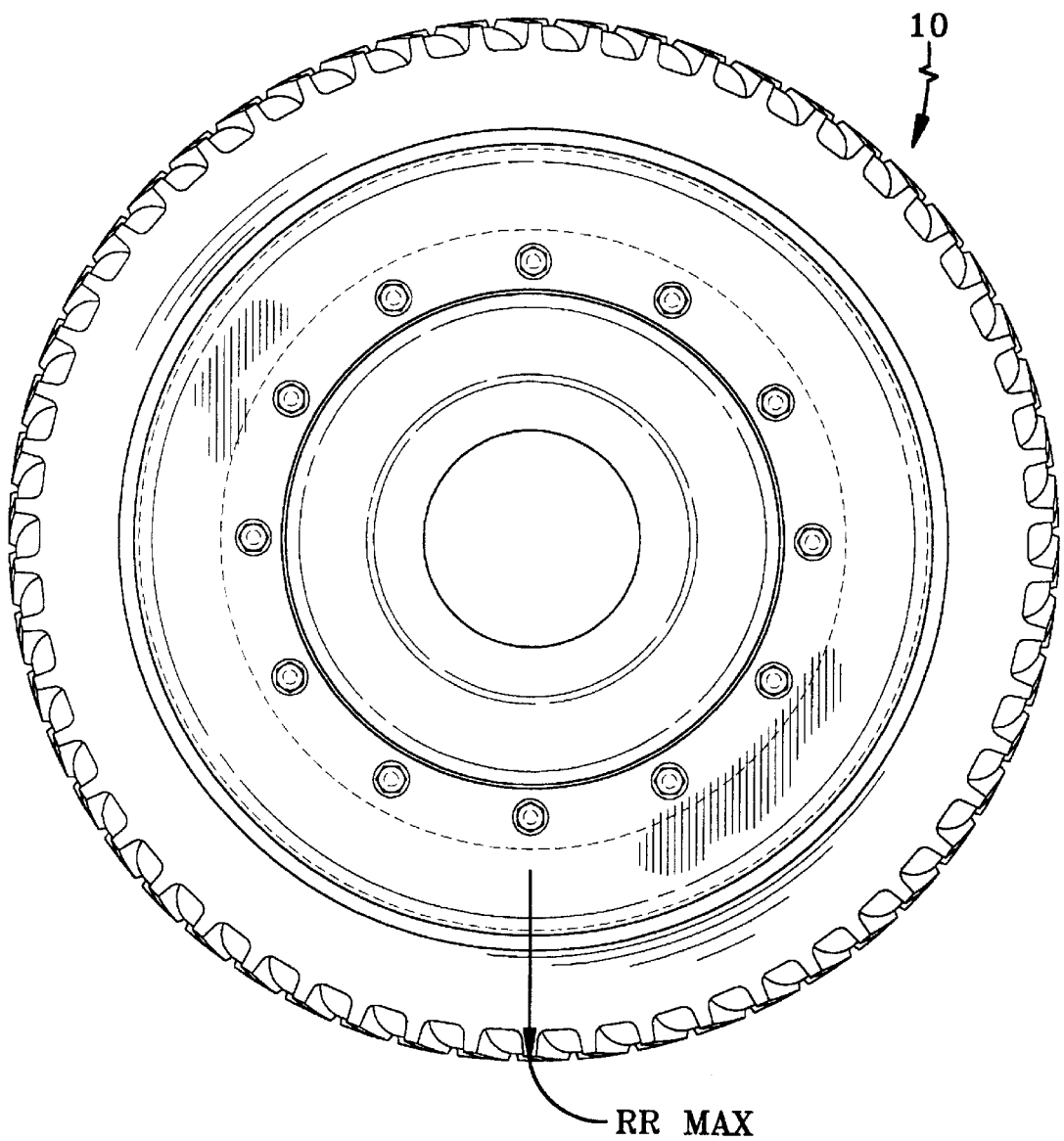
FIG. 12 shows the maximum runout location being shifted to the 6 o'clock position.
Figure 13A:
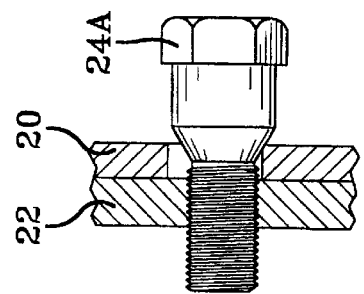
FIGS. 13 and 13A show the replacement of a standard bolt with a tapered bolt wherein the contact point is at the lower half of the hole of the rim 20.
Figure 13:
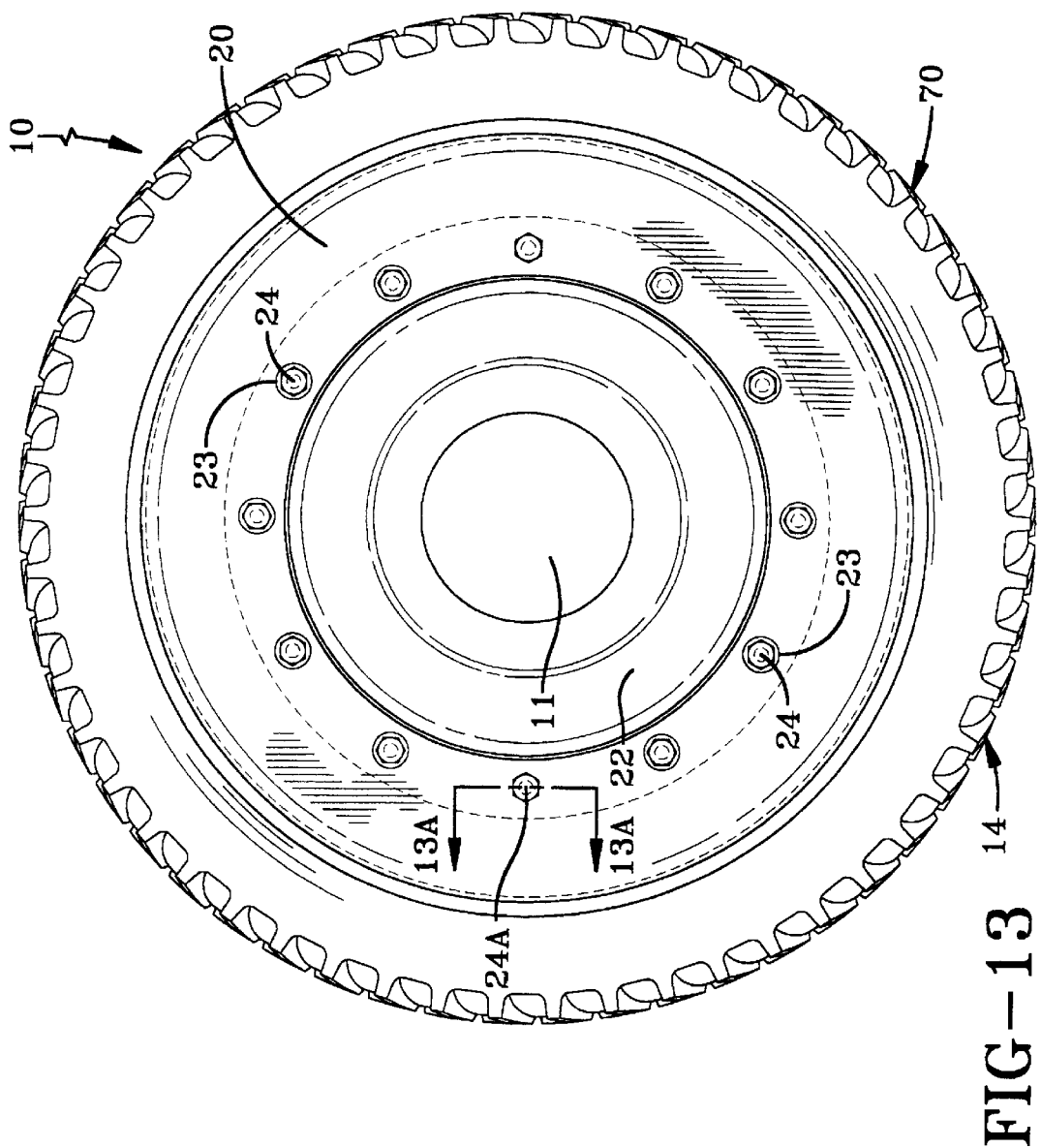
Figure 14A:
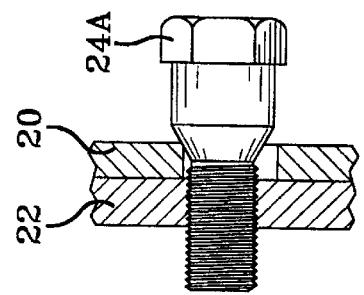
FIGS. 14 and 14A show the replacement of a standard bolt with a tapered bolt wherein the contact point is in the upper half of the hole of the rim 20.
Figure 14:
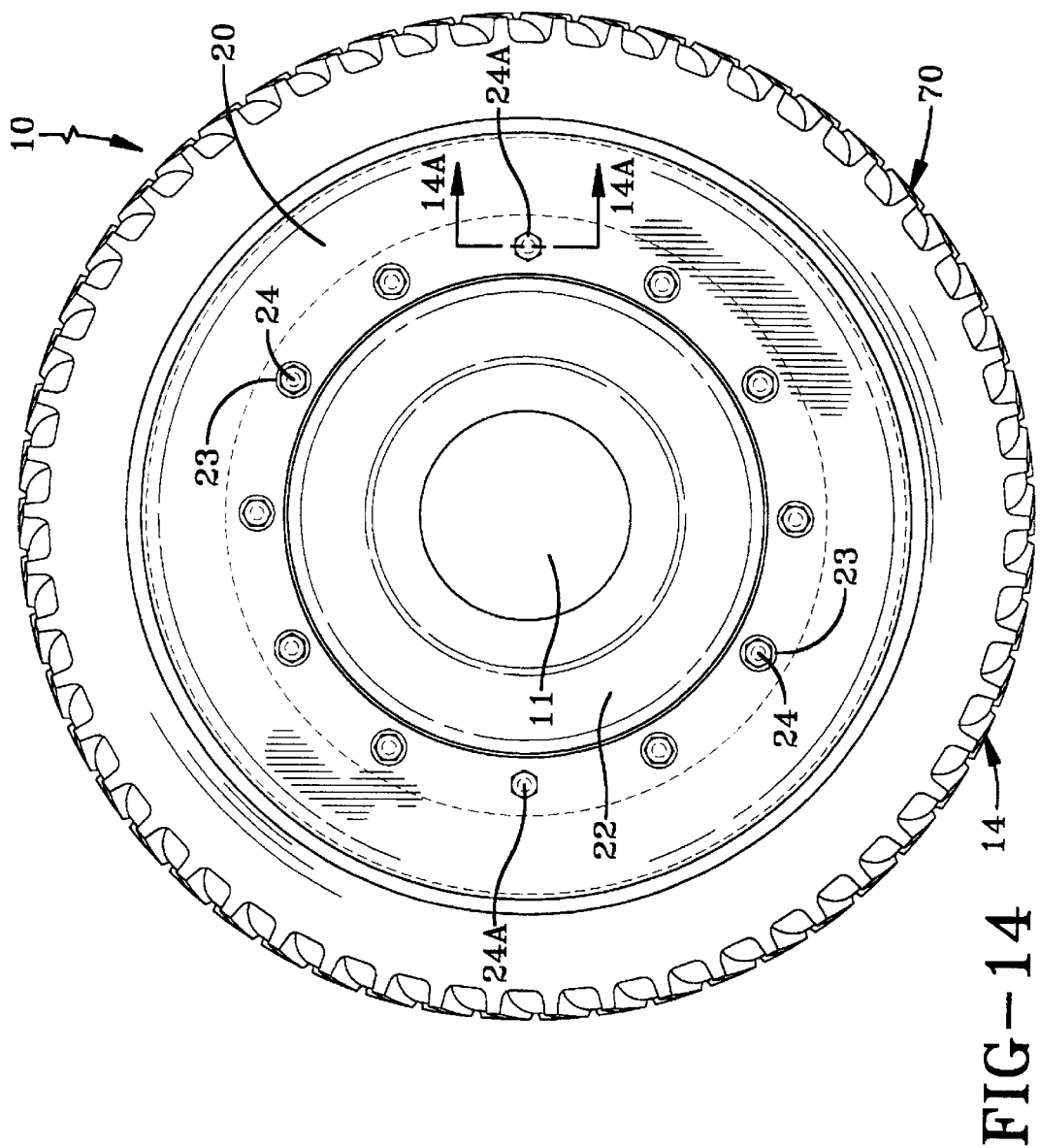

The technician then marks on the tire 14 where the indicator registered the highest value. The magnitude displayed at this point is equal to the total radial runout of the tire and rim assembly 10 relative to the center hub 11, assuming a full scale dial indicator is used, or half the total magnitude, if the preferred indicator 30 is employed. As shown in FIG. 12 the technician then rotates the tire until the mark of the highest point is at the 6 o'clock position, this location is closest to the ground. The technician then removes two rim flange bolts closest to the 3 o'clock and 9 o'clock positions on the wheel as shown in 12. He replaces these bolts 24 with two shoulder tapered bolts 24A. He tightens the bolts 24A until they make contact with the clearance bolt holes 28 of the rim 20. The technician then notes the location of contact between the tapered bolts 24A and the bolt holes. If the tapered bolt is contacting the lower half of the hole of the rim as shown in FIGS. 13 and 13A, he will follow the procedure. If the bolts are contacting the top half of the bolt hole as shown in FIGS. 14 and 14A, he will follow the following procedures.

Figure 15:
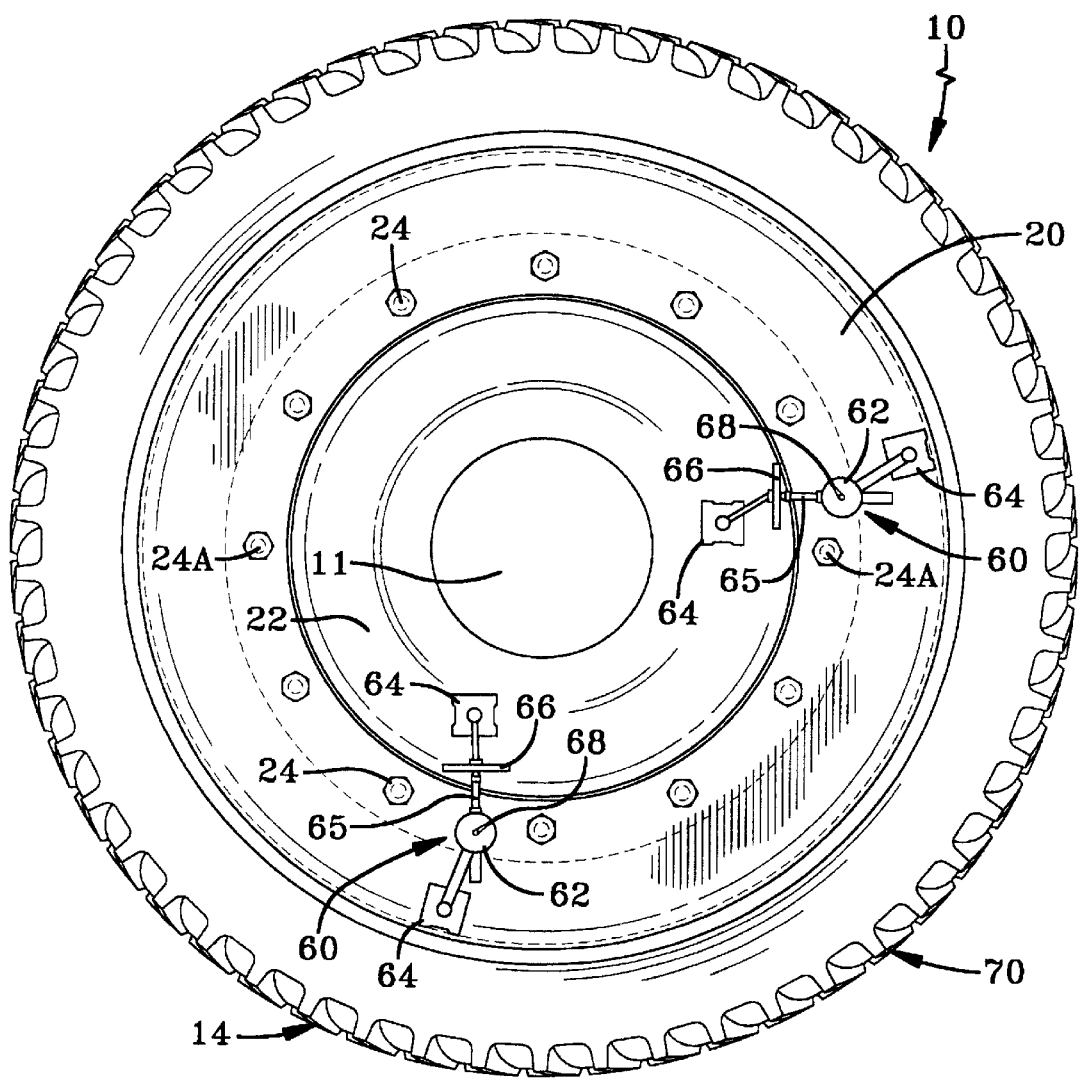
FIG. 15 shows the location of the vertical and horizontal displacement indicators.

He will loosen each rim flange bolt 24 one at a time, immediately retightening each bolt until the bolt 24 or bolt 24 and washer 23 (if a washer is used) is snug but still able to be rotated freely by hand. By doing this, he is ensuring that the rim 20 is free slide relative to the disk 22. He then attaches one of the dial indicators 60 to the rim flange by some mechanical means such as with the aid of the magnetic base stand 64 as shown in FIG. 15. The indicator's displacement arm 65 should be horizontal and pointing in the axial direction. The indicator 60 should be affixed to the rim flange at about the same level as the axle 11. The technician then attaches the second dial indicator 60 to the rim flange with another magnetic base stand 64. This indicator 60 should be placed at the wheel assembly's 6 o'clock position as shown in FIG. 15. The indicator's arm 65 should be oriented vertically as shown in the figure.

The technician then attaches two flat contact plates 66 to the center disk of the wheel assembly with the remaining two magnetic base stands 64 as shown in the figure. The contact plates 66 should be arranged so that they are perpendicular to the indicator arms 65 so that they displace the indicator arms 65 by approximately one-half of the indicator's 60 total allowable travel.

The technician then zeros both of the dial indicators 60. He slowly begins to tighten one of the taper bolts 24A causing the rim 20 to ride up the taper of the bolt 24A causing the tire 14 and rim 20 to rise up at that point. This tightening may also slightly shift the tire 14 and rim 20 horizontally to one side. The vertical displacement will be registered by the indicator 60 positioned at 6 o'clock. The vertical displacement is desirable while the horizontal movement is unwanted. Any horizontal movement will be detected by the dial indicator 60 positioned at 3 o'clock. To correct for the unwanted horizontal movement, the technician slowly tightens the other tapered bolt 24A. This should reduce the horizontal displacement caused by tightening the first tapered bolt 24A. It will also increase the vertical displacement. Loosening of the bolts will reverse the effect of their tightening.

The technician continues alternating the tightening and the loosening of the tapered bolts 24A until the vertical displacement indicator 60 reads one-half of the total indicated runout if using Just a normal dial indicator as measured previously or until there is no additional vertical movement resulting from continued tightening. If the vertical movement measured by the vertical dial indicator is equal to one-half of the total indicated runout, then the runout has been corrected. If on the other hand the vertical movement measured is less than one-half the total indicated runout, therefore needing further correction then the technician must firmly retighten the two bolts 24 adjacent each tapered bolt 24A. By tightening these bolts 24 he prevents further relative movement of the rim 20 and disk 22.

When the taper bolts are contacting lower half of the bolts hole as seen in FIGS. 13 and 13A or if the assembly needs further correction, the technician rotates the tire 14 until the point marked as the highest point is the 12 o'clock position. He then loosens every bolt 24 except the tapered bolts 24A and slowly begins to loosen one of the two tapered bolts 24A. This will cause the rim 20 to slide down on the tapered bolt 24 causing the tire 14 and rim 20 to lower at that point. It may also slightly shift the tire 14 and rim 20 horizontally to one side. The vertical displacement will be registered by the indicator 60 registered at 6 o'clock. The vertical displacement is desirable while the horizontal movement is again unwanted. Any horizontal movement will be detected by the dial indicator 60 positioned at 3 o'clock. To correct for the unwanted horizontal movement the technician slowly loosens the other tapered bolt 24A. This should reduce the unwanted horizontal displacement caused by loosening the first tapered bolt 24A. It will also increase the desirable vertical displacement as previously noted. Loosening of the bolts will reverse the effect of their tightening. The technician continues alternating the loosening and tightening of the bolts 24A until the vertical displacement indicator reads one-half of the indicated runout as measured in the earlier procedure or until there is no additional vertical movement resulted from continued loosening. The technician then firmly retightens all the bolts to the factory recommended torque setting excluding the tapered bolts 24A. He removes and replaces the tapered bolts 24A with the standard bolts 24A that were previously removed. He tightens these bolts 24 to the factory recommended torque setting as well. He then removes the four magnetic bases 64 and retightens any bolts 24 that were inaccessible due to the positioning of the stands 60.

The technician then rechecks the radial runout as previously outlined.

As can be seen from the above outlined procedure, a single technician can easily and very accurately move the relative position of the disk 22 to the rim flange 20 to achieve a zeroing of the radial runout condition. This means that a dramatic reduction in the first harmonic forces can be achieved very simply by the use of this procedure.

Whether the procedure is used whereby the tire rim assembly 10 is physically removed from the tractor or if the use of the tapered bolts 24A in the methods outlined above is employed, both methods will achieve the beneficial results described in the figures and charts as disclosed herein.

What is claimed is:

1. A method for minimizing a radial runout of a tire and rim assembly, the rim having an outer rim and a disk attached to the outer rim, by threaded fasteners, the method comprising the steps of locating a position of maximum radial runout and measuring an amount of maximum radial runout; loosening the treaded fasteners; providing a device for precisely moving the disk relative to the outer rim, moving the disk radially toward the position of maximum radial runout; and then tightening the threaded fasteners thereby securely attaching the disk to the tire and outer rim of the assembly; and wherein the step of providing a device for precisely moving the disk relative to the outer rim is characterized by the steps of removing two threaded fasteners;

moving the disk radially toward the position of maximum radial runout a distance about one-half the measured runout amount; and replacing each of the removed two threaded fasteners with a taper bolt, the taper of these bolts providing a surface to precisely move the disk relative to the outer rim after loosening remaining threaded fasteners attaching the disk to the outer rim.

2. The method of claim 1 further characterized by the step of:

tightening or loosening of the taper bolts to achieve a precise vertical displacement of the disk relative to the outer rim while the tire and rim assembly remains attached to a vehicle.

3. The method of claim 2 further characterized by the step of:

tightening or loosening one taper bolt relative to the opposite tapered bolt to achieve a horizontal movement of the disk relative to the outer rim as well as a vertical displacement.

* * * * *